2,951,082
SUBSTITUTED THIAXANTHENES

James M. Sprague and Edward L. Engelhardt, Gwynedd Valley, Pa., assignors to Merck & Co., Inc., Rahway, N.J., a corporation of New Jersey
No Drawing. Filed July 9, 1956, Ser. No. 596,384
8 Claims. (Cl. 260—328)

This invention relates to new chemical compounds and to novel methods for preparing them. The feature of this invention which relates to novel compounds is particularly concerned with new thiaxanthene derivatives having the general formaula:

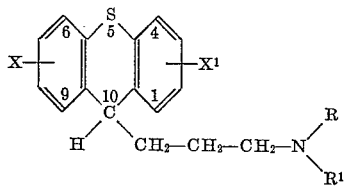

and non-toxic acid addition salts thereof, wherein X represents hydrogen, halogen, such as chlorine, bromine, fluorine and iodine, a lower alkyl radical, for example a straight or branched chain alkyl radical having from 1 to about 4 carbon atoms, and lower alkoxy radicals preferably having a straight or branched chain with from 1 to 4 carbon atoms; $X^1$ represents halogen, for example chlorine, bromine, fluorine or iodine, a lower alkyl radical, for example a straight or branched chain alkyl radical having from 1 to about 4 carbon atoms, and a lower alkoxy radical preferably having a straight or branched alkyl chain of 1 to about 4 carbon atoms; and

is a tertiary amino group which advantageously is a di-lower-alkylamino, 1-piperidyl, 1-pyrrolidyl or 4-morpholinyl group. One or more of the hydrogens attached to the trimethylene side chain can be substituted by a lower alkyl group provided the total number of carbons in all substituent alkyl groups does not exceed 4. When one or more of the trimethylene hydrogens is substituted by an alkyl group, one of the alkyl substituents can be linked with $R^1$ to form a heterocyclic ring including the nitrogen atom.

The compounds of this invention have been found to be valuable therapeutic agents and when used for this purpose they are conveniently administered in the form of their acid addition salt. The identity of the acid which forms the salt is of little importance provided it is non-toxic. Salts derived from inorganic acids as well as organic acids have been found suitable for preparing therapeutic dosage forms. The salts are, therefore, considered to be equivalent to the bases.

The various methods that have been found to be particularly suitable for preparing the novel compounds of this invention can be illustrated by the following reaction scheme:

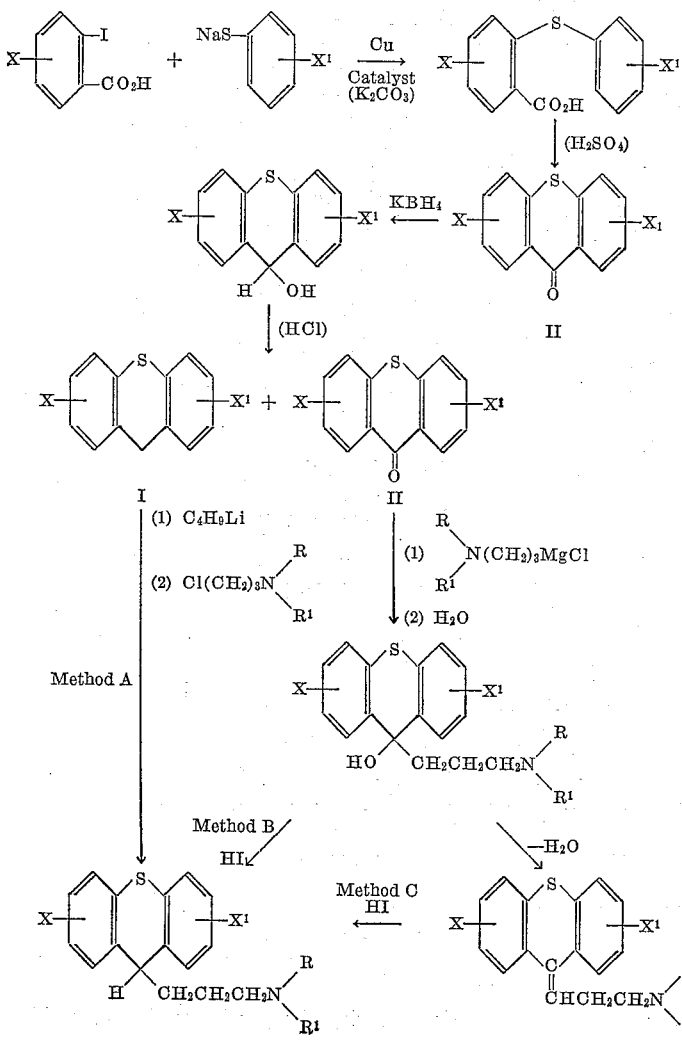

The notations Method A, Method B and Method C in the above reaction scheme identify the three main methods for preparing the thiaxanthene derivatives. Method B and Method C are novel processes and constitute another feature of this invention.

The intermediate thiaxanthenes and thiaxanthones numbered I and II in the above reaction scheme are made by known methods. The method illustrated above involves condensing an alkali metal salt of a 2-halobenzoic acid with an alkali metal salt of a thiophenol in the presence of a copper cataylst of the type employed in the Ullmann reaction. The substituted 2-carboxyphenyl sulfide thus obtained is cyclized to the corresponding thiaxanthone with the aid of a dehydrating agent, such as concentrated sulfuric acid, phosphorus pentoxide, polyphosphoric acid, metaphosphoric acid and the like. The thiaxanthone then is reduced to the corresponding thiaxanthydrol with sodium or potassium borohydride. This reaction can be carried out with heating in a suitable solvent. Disproportionation of the thiaxanthydrol by acid, advantageously in a suitable solvent such as alcohol, yields a mixture of the corresponding thiaxanthene and thiaxanthone. The thiaxanthene is separated from the thiaxanthone by known methods, such as distillation, or solvent extraction.

According to Method A, the thiaxanthene is converted to an alkali metal derivative by means of an organometallic compound derived from an alkyl or aryl hydrocarbon and an alkali metal. Butyllithium or phenyllithium are used most frequently for this purpose. The alkali metal derivative of the thiaxanthene then is alkylated with a 3-tertiaryaminopropyl halide, such as the chloride or bromide, to a 10 - (3-tertiaryaminopropyl)-thiaxanthene.

The thiaxanthone, obtained as described above, is converted to a tertiary alcohol by a modified Grignard reaction. According to this process, the Grignard reagent is prepared from the appropriate 3-tertiaryaminopropyl halide in tetrohydrofuran. The desired thiaxanthone derivative then is added to the reaction mixture. After hydrolysis of the Grignard adduct, the 10 - (3 - tertiaryaminopropyl)-10-hydroxythiaxanthene is isolated.

The tertiary alcohol can be directly reduced, according to Method B by hydrogen iodide, or any modification thereof which will produce hydrogen iodide in situ, to the 10-(3-tertiaryaminopropyl)-thiaxanthene. The reduction of the tertiary hydroxy compound is advantageously carried out by dissolving it in a solvent, such as acetic acid, adding the reducing agent and then refluxing until the reaction is completed. A reducing agent for iodine, such as phosphorus or hypophosphorous acid can, if desired, be employed to reconvert the iodine liberated to hydrogen iodide.

Alternatively, the 10 - (3 - tertiaryaminopropyl)-10-hydroxythiaxanthene can be dehydrated to the corresponding 10-(3-tertiaryaminopropylidene)-thiaxanthene which then is reduced with hydrogen iodide, or a modification thereof which will produce hydrogen iodide in situ, under the conditions described above to the desired 10-(3-tertiaryaminopropyl)-thiaxanthene.

The dehydration can be effected by known procedures employing known dehydrating agents. Dehydrating agents which have been found especially useful are acetyl chloride, thionyl chloride and acetic anhydride. Other dehydrating agents as potassium bisulfate, concentrated hydrochloric acid and the like, can also be used. Solvents which are well adapted to the requirements of this step when acetyl chloride or a similar dehydrating agent is employed are chloroform and methylene chloride.

The 10-(3-tertiaryaminopropyl)-thiaxanthene obtained by any of the above methods can be converted to an acid addition salt by the usual methods. For example, the base can be dissolved in absolute alcohol and the selected acid added thereto. Mineral acid addition salts and organic acid addition salts such as salts derived from hydrochloric, hydrobromic, sulfuric, phosphoric, acetic, benzoic, tartaric acids, and the like, can be prepared by this or other suitable methods.

If it is desired to have an alkoxy substituent on the thiaxanthene nucleus, these compounds preferably are made by Method A above because hydrogen iodide of Methods B and C will also attack the alkoxy radical. However, Methods B and C are operable for all of the other derivatives, except the alkoxy substituted thiaxanthenes, falling within the generic structure above.

The new compounds which are unsymmetrically substituted in the thiaxanthene nucleus are obtained as racemic mixtures. The enantiomorphs can be separated by known methods such as by preparing salts with optically active acids, e.g. dextro and levo tartaric acids. While the racemic mixtures exhibit therapeutic properties of the type possessed by these novel compounds, in some instances the activity may be greater in one pure enantiomorph than the other.

The compounds of this invention have been found to be valuable therapeutic agents particularly because of their antiemetic, barbiturate potentiating and tranquilizing properties. The dosage level of any one of the thiaxanthene compounds will vary over a relatively wide range from pediatric to geriatric use and from one clinical indication to another. For this reason, scored tablets containing 25 to 100 mgs. of the active ingredient can be made available to the physician for the symptomatic adjustment of dosage to the individual patient. Sterile solutions of from 1 to about 5% also can be made available to the physician for parenteral administration on the same basis. All of these dosages are well below the toxic or lethal dose of the compounds falling within the scope of this invention. Chronic toxicity studies in dogs using 2-chloro-10-(3-dimethylaminopropyl)-thiaxanthene hydrobromide have demonstrated that quantities as high as 20 mgs. per kg. per day (calculated as the base) administered orally (which is equivalent to about 9 mgs. per pound per day) are tolerated without any untoward toxic manifestations. The lethal dose in mice, $LD_{50}$, has been found to be 39 mgs. per kg. intravenously and 472 mgs. per kg. orally. It is evident from these data that tablets or solutions containing the dosages described above fall well below the lethal dose of this compound and are substantially below the 20 mg. per kg. dose which was well tolerated by dogs over a substantial period of time.

This invention will be described more fully in conjunction with the following examples. It will be understood, however, that these examples are given by way of illustration only, and that the invention is not to be construed as limited in spirit or in scope by the details set forth. It will be apparent to chemists skilled in the art of organic synthesis that many modifications in materials, conditions and methods may be made without departing from the invention. Where in the following examples a particular intermediate, such as a particular thiaxanthone, is not known, it can be prepared by the method illustrated above from the known appropriately substituted 2-iodobenzoic acid. Where the 2-iodobenzoic acid has not previously been described, it can be prepared from the appropriate anthranilic acid by the method described by D. A. Shirley in "Preparation of Organic Intermediates," John Wiley & Sons Inc. (1951), page 182.

*Example 1.—2-chloro-10-(3-dimethylaminopropyl)-thiaxanthene hydrobromide*

Step A.—4-chlorothiophenol, 43.4 g. (0.3 mole), was added to a solution of 6.9 g. (0.3 g. atom) of sodium in 150 ml. absolute ethanol and the mixture evaporated to dryness under reduced pressure. 2-iodobenzoic acid, 74.4 g. (0.3 mole), anhydrous potassium carbonate, 42 g. (0.3 mole), and copper powder, 3 g., were mixed thoroughly with the residue and the mixture heated in an oil bath at 190–200° C. for four hours. After cooling, the solid cake was dissolved in water and the product, 2- carboxy-4'-chlorophenyl sulfide, precipitated by acidification with dilute hydrochloric acid. Reprecipitation from sodium bicarbonate solution and crystallization from alcohol (3A anhydrous) yielded 34.8 g. (44%) of colorless prisms, M.P. 227–231° C. An analytical sample obtained by repeated recrystallization from alcohol (3A anhydrous) melted at 229–231° C.

Analysis.—Calculated for $C_{13}H_9O_2ClS$: C, 58.99; H, 3.43. Found: C, 59.01; H, 3.50.

Step B.—A solution of 60.6 g. (0.23 mole) of 2-carboxy-4'-chlorophenyl sulfide in 325 ml. concentrated sulfuric acid was warmed on the steam-bath for thirty minutes; cooled in ice, and poured into one liter of ice and water. After collection on the filter and washing with water, the yellow solid was suspended in 5% aqueous sodium hydroxide and again collected and washed. Crystallization from alcohol (3A anhydrous) afforded 44.45 g. (79%) of 2-chlorothiaxanthone in the form of yellow needles, M.P. 146–148° C. An analytical sample recrystallized from glacial acetic acid melted at 148–149° C.

Analysis.—Calculated for $C_{13}H_7OClS$: C, 63.30; H, 2.86. Found: C, 63.30; H, 2.86.

Step C.—2-chlorothiaxanthone, 58 g. (0.235 mole), was suspended in 1200 ml. of refluxing methanol. A filtered solution of 31.8 g. (0.59 mole) of potassium borohydride in 150 ml. of water containing two pellets of potassium hydroxide was added dropwise over a thirty minute period. After stirring for two hours at reflux, the bulk of the methanol was distilled over a two hour period, the residual solution diluted with 200 ml. of water and cooled in ice. The yield of 2-chlorothiaxanthydrol, M.P. 127–129° C. was 56.8 g. (97%).

Step D.—The crude 2-chlorothiaxanthydrol, 56 g. (0.224 mole), was dissolved in 384 ml. of absolute alcohol. Dry hydrogen chloride in absolute alcohol (16 ml. of a 9.3 N solution) was added and the solution refluxed for 3 hours. On cooling, a crystalline solid separated. This material, M.P. 91–93° C. to a cloudy melt, weighed 42.9 g. It consists of a mixture of 2-chlorothiaxanthene and 2-chlorothiaxanthone. The mixture was distilled under reduced pressure and the fraction boiling at 165–170° C. (0.8 mm.) was collected. It solidified on cooling to a crystalline product, M.P. 91–93° C., yield, 25.6 g. The product was dissolved in 1 liter of cold petroleum ether (B.P. 30–60° C.) and the insoluble material removed by filtration. After concentrating the solution, the product was allowed to crystallize, collected and recrystallized from alcohol (3A anhydrous). The yield of 2-chlorothiaxanthene, M.P. 98–100.5° C., was 16.85 g. (46%).

Analysis.—Calculated for $C_{13}H_9ClS$: C, 67.09; H, 3.90; Cl, 15.24. Found: C, 66.95; H, 3.84; Cl, 15.37.

Step E.—A solution of butyllithium in absolute ether, 50 ml., was prepared from 0.590 g. (0.085 g. atom) of lithium and 6.2 g. (0.045 mole) of butyl bromide by the method of Gilman, Beel, Brannen, Bullock, Dunn and Miller, J. Am. Chem. Soc. 71, 1499 (1949). A nitrogen atmosphere was maintained in the reaction vessel throughout. 2-chlorothiaxanthene, 7.5 g. (0.032 mole), dissolved in 75 ml. of absolute ether was added dropwise over a period of 15 minutes. The resulting dark red-brown solution was stirred at room temperature for 30 minutes then at reflux for 30 minutes. A solution of 4.0 g. (0.033 mole) of 3-dimethylaminopropyl chloride (dried over calcium hydride) in 10 ml. of absolute ether then was added over a 10 minute period. The ether was refluxing gently during the addition. The mixture was stirred at room temperature for 2 hours then allowed to stand overnight. The reaction mixture was cooled in an ice-bath and the excess butyllithium hydrolyzed by the addition of water. The ether layer was separated and extracted with dilute hydrochloric acid until the extracts were no longer colored. The combined acid extracts were made basic and the red-brown oil that separated extracted with ether. After washing with water, the ether layer was dried over anhydrous potassium carbonate. After evaporation of the ether the residue was distilled under reduced pressure in a nitrogen atmosphere. The yield of 2-chloro-10-(3-dimethylaminopropyl)-thiaxanthene, a viscous yellow oil, B.P. 230–235° C. (0.3 mm.), was 5.4 g. (53%).

Step F.—The product obtained in step E was dissolved in 15 ml. of absolute alcohol and the solution treated with 2.2 ml. of 8.72 N hydrobromic acid. On cooling the solution in ice, the hydrobromide separated in the form of colorless crystals. The crude product, M.P. 188–190° C. weighed 4.3 g. After two recrystallizations from a mixture of absolute alcohol and absolute ether the 2-chloro-10-(3-dimethylaminopropyl)-thiaxanthene hydrobromide melted at 190–191.5° C., unchanged by a further recrystallization.

Analysis.—Calculated for $C_{18}H_{20}NClS \cdot HBr$: C, 54.21; H, 5.31; N, 3.51; Cl, 8.89. Found: C, 54.21; H, 5.30; N, 3.53; Cl, 8.78.

*Example 2.—2-chloro-10-(3-diethylaminopropyl)-thiaxanthene hydrobromide*

A solution of butyllithium in absolute ether, 100 ml., was prepared from 0.72 g. (0.104 g. atom) of lithium and 7.38 g. (0.054 mole) of butyl bromide by the method of Gilman et al. supra (Example 1, step E). While maintaining the nitrogen atmosphere, 2-chloro-thiaxanthene, 9.00 g. (0.0387 mole) was added in portions over a period of 5 minutes. The temperature was 5–10° C. during the addition. When the addition was complete, 100 ml. of absolute ether was added and the reddish brown reaction mixture then was stirred at room temperature for 30 minutes followed by 30 minutes at reflux. 3-diethylaminopropyl chloride, 6.44 g. (0.043 mole) then was added dropwise maintaining gentle reflux by controlling the rate of addition. The reaction mixture was stirred 2 hours at room temperature and allowed to stand overnight. The reaction mixture then was cooled in an ice bath and 50 ml. of water added dropwise with stirring. The water layer was discarded and the ether layer extracted with 100 ml. of 3 N hydrochloric acid in three portions. The combined acid extracts were made basic with sodium hydroxide and the base extracted with ether. After washing with water, the extract was dried over potassium carbonate and the ether evaporated on the steam-bath. The residue was distilled under reduced pressure and the fraction, B.P. 188–190° C. collected. The base was dissolved in 20 ml. of absolute alcohol, the solution treated with 3.9 g. of 48% hydrobromic acid and diluted with 85 ml. of absolute ether. The white crystalline 2-chloro-10-(3-diethylaminopropyl)-thiaxanthene hydrobromide melted at 162–163° C. The melting point was unchanged by a further recrystallization from a mixture of absolute alcohol and absolute ether.

Analysis.—Calculated for $C_{20}H_{24}NClS \cdot HBr$: C, 56.27; H, 5.90; N, 3.28. Found: C, 56.03; H, 6.11; N, 3.26.

*Example 3.—2-methoxy-7-chloro-10-[3-(4-morpholinyl)-propyl]-thiaxanthene hydrobromide*

By replacing the 4-chlorothiophenol and the 2-iodobenzoic acid employed in Example 1, step A, by an equimolecular quantity of 4-methoxythiophenol and 4-chloro-2-iodobenzoic acid and following the procedures described in steps A–D of Example 1, there was obtained 7-chloro-2-methoxythiaxanthene.

The thus obtained thiaxanthene (0.03 mole), was converted to 2-methoxy-7-chloro-10-[3-(4-morpholinyl)-propyl]-thiaxanthene by means of butyllithium and 3-(4-morpholinyl)-propyl-chloride according to the procedure described in Example 1, step E. The base then was converted to the hydrobromide salt by the process described in Example 1, step F.

*Example 4.—2,7-diethoxy-10-(3-dipropylaminopropyl)-thiaxanthene hydrobromide*

By replacing the 4-chlorothiophenol and the 2-iodobenzoic acid employed in Example 1, step A, by an equimolecular quantity of 4-ethoxythiophenol and 2-iodo-4-ethoxybenzoic acid and following the procedures described in steps A–D of Example 1, there was obtained 2,7-diethoxythiaxanthene.

The thus obtained thiaxanthene (0.03 mole), butyllithium and 3-dipropylaminopropyl chloride then were reacted according to the procedure described in Example 1, step E, to yield 2,7-diethoxy-10-(3-dipropylaminopropyl)-thiaxanthene which was converted to the hydrobromide salt by the process described in Example 1, step F.

*Example 5.—2-fluoro-7-isopropyl-10-[3-(1-pyrrolidyl)-propyl]-thiaxanthene hydrobromide*

By replacing the 4-chlorothiophenol and the 2-iodobenzoic acid employed in Example 1, step A, by an equimolecular quantity of 4-fluorothiophenol and 2-iodo-4-isopropylbenzoic acid respectively and following substantially the same procedures described in Example 1, steps A–D, there was obtained 2-fluoro-7-isopropylthiaxanthene.

The thus obtained thiaxanthene, butyllithium and 3-(1-pyrrolidyl)-propyl chloride then were reacted according to the procedures described in Example 1, step E, yielding 2-fluoro-7-isopropyl-10-[3 - (1 - pyrrolidyl) - propyl]-thiaxanthene which was converted to the hydrobromide salt by the process described in Example 1, step F.

*Example 6.—2-methyl-6-fluoro-10-(3-dimethylaminopropyl)-thiaxanthene hydrobromide*

By replacing the 4-chlorothiophenol and the 2-iodobenzoic acid employed in Example 1, step A, by an equimolecular quantity of 2-methylthiophenol and 2-iodo-3-fluorobenzoic acid respectively and following substantially the same procedures described in Example 1, steps A–F, there was obtained 2-methyl-6-fluoro-10-(3-dimethylamino propyl)-thiaxanthene hydrobromide.

*Example 7.—2-chloro-10-(3-dimethylaminopropyl)-thiaxanthene hydrobromide*

Step A.—Magnesium turnings, 4.86 g. (0.2 g. atom) was placed in a 500 ml. reaction flask fitted with a mercury sealed stirrer, reflux condenser and a dropping funnel. Tetrahydrofuran, 50 ml. and calcium hydride, 500 mg. were added. Ethyl bromide, 2.18 g. and a crystal of iodine then were added. A vigorous reaction set in that evolved sufficient heat to induce refluxing. After 5 minutes, a solution of 3-dimethylaminopropyl chloride (dried over calcium hydride) in 50 ml. of tetrahydrofuran was added to the refluxing solution at such a rate that gentle refluxing was maintained. The addition required 25 minutes. The reaction mixture was stirred at reflux for an additional 30 minutes when nearly all of the magnesium had dissolved and determination of magnesium in an aliquot of the solution showed that an 82% yield of Grignard reagent had been obtained. The reaction mixture was cooled in an ice bath and stirred while 24.67 g. (0.1 mole) of 2-chlorothiaxanthone was added over a period of 10 minutes. The reaction was stirred at room temperature for 30 minutes then allowed to stand overnight in the refrigerator. The tetrahydrofuran was evaporated at 50° C. under reduced pressure. Benzene, 150 ml., was added to the residue. The mixture was hydrolyzed in the cold by the dropwise addition of 50 ml. of water. The benzene layer was separated by decantation and the gelatinous precipitate washed with two 100 ml. portions of benzene. The precipitate was then mixed with diatomaceous earth, collected on a filter, and washed with water and extracted with two 100 ml. portions of boiling benzene. The aqueous filtrate was extracted with 50 ml. of benzene, the combined benzene extracts washed with water and evaporated to dryness under reduced pressure. The crystalline residue, M.P. 140–147° C., weighed 30.8 g. Recrystallization from a mixture of benzene and hexane gave 27.6 g. (83%) of 2-chloro-10-(3-dimethylaminopropyl)-10-hydroxythiaxanthene, M.P. 152–154° C. Analytically pure material from another experiment melted at 153–154° C.

*Analysis.*—Calculated for $C_{18}H_{20}ONClS$: C, 64.75; H, 6.04; N, 4.20. Found: C, 64.80; H, 5.95; N, 4.20.

Step B.—2-chloro - 10 - (3-dimethylaminopropyl) - 10-hydroxythiaxanthene, 16.70 g. (0.05 mole) was added to a mixture of 50 ml. of 55% hydriodic acid [treated with hypophosphorous acid at 100° C. to reduce free iodine according to Clark, Semimicro Quantitative Organic Analysis, Academic Press (1943), p. 70] and 50 ml. of glacial acetic acid. Phosphorus (red), 6.20 g. (0.2 gram atom) then was added and the mixture heated to refluxing for 3 hours while passing a slow stream of nitrogen through the apparatus. The unreacted phosphorus then was separated by filtration through a sintered glass disc and the filtrate concentrated on the steam-bath under reduced pressure. After approximately 50 ml. of distillate had been collected, a white crystalline solid began to separate. The distillation was interrupted at this point and the residue diluted with 200 ml. of water and made basic with 100 ml. of 10 N sodium hydroxide. Benzene, 100 ml. was added to the mixture which then was heated on the steam-bath with stirring until the solid dissolved. The benzene layer was separated and the aqueous layer extracted with another 100 ml. portion of benzene. The combined extracts were washed with water and the solvent evaporated on the steam-bath under reduced pressure. The 2-chloro-10-(3-dimethylaminopropyl)-thiaxanthene was obtained as a pale yellow oily residue weighing 15.65 g. (98%).

The product was converted to the hydrobromide by suspending the base in 25 ml. of water, adding 7.0 ml. of 48% hydrobromic acid and evaporating to dryness on the steam-bath under reduced pressure. The residue was recrystallized from a mixture of absolute alcohol and absolute ether to give 18.28 g. (91.7%) of 2-chloro-10-(3-dimethylaminopropyl) - thiaxanthene hydrobromide, M.P. 194–195° C. The hydrobromide is a white crystalline water-soluble material.

*Example 8.—2,8 - dichloro-10-(3-dimethylaminopropyl)-thiaxanthene hydrochloride*

Step A.—The Grignard reagent was prepared from 9.35 g. (0.384 g. atom) of magnesium and 46.7 g. (0.384 mole) of 3-dimethylaminopropyl chloride, using 3.3 g. of ethyl bromide and employing 150 ml. of tetrahydrofuran as solvent. The procedure of Example 7, step A was followed. To the Grignard solution was added 54 g. (0.192 mole) of 2,8-dichloro-thiaxanthone. After stirring at room temperature for 1 hour, the bulk of the tetrahydrofuran was distilled at reduced pressure keeping the temperature below 50° C. The residue was taken up in benzene and hydrolyzed in the cold by the dropwise addition of 75 ml. of water. The benzene layer was separated and the solid extracted with four 100 ml. portions of hot benzene. The combined benzene extracts were concentrated under reduced pressure and the residue crystallized from a mixture of benzene and hexane. The yield of product, 2,8-dichloro-10-(3-dimethylaminopropyl)-10 - hydroxythiaxanthene, M.P. 191.3–192.3° C., was 46.4 g. The product from a similar experiment melted at 190.8–191.8° C. after repeated crystallization from mixtures of benzene and hexane.

*Analysis.*—Calculated for $C_{18}H_{19}ONCl_2S$: C, 58.70; H, 5.20; N, 3.80. Found: C, 58.77; H, 5.09; N, 3.79.

Step B.—By using 18.4 g. (0.05 mole) of the thus obtained 2,8-dichloro - 10 - (3-dimethylaminopropyl)-10-hydroxythiaxanthene in place of the 2-chloro-10-(3-dimethylaminopropyl) - 10 - hydroxythiaxanthene of Example 7, step B, and following substantially the procedure of Example 7, step B, there was obtained 17.50 g. (99%)

of 2,8-dichloro-10-(3-dimethylaminopropyl)-thiaxanthene. The hydrochloride was prepared by treating a solution of the base in absolute alcohol with a solution of dry hydrogen chloride in absolute alcohol. The 2,8-dichloro-10-(3-dimethylaminopropyl)-thiaxanthene hydrochloride melted at 243–244° C. after recrystallization from absolute alcohol.

*Analysis.*—Calculated for $C_{18}H_{19}NCl_2S \cdot HCl$: C, 55.60; H, 5.19; N, 3.60. Found: C, 55.79; H, 5.24; N, 3.59.

*Example 9.—2 - chloro-10-[3-(4-morpholinyl)-propyl]-thiaxanthene hydrochloride*

Step A.—By replacing the 3-dimethylaminopropyl chloride employed in Example 7, step A, by an equimolecular quantity of 3-(4-morpholinyl)-propyl chloride and following substantially the same procedure described in Example 7, step A, there was obtained 2-chloro-10-[3-(4-morpholinyl)-propyl] - 10 - hydroxythiaxanthene, M.P. 114.5–116° C.

*Analysis.*—Calculated for $C_{20}H_{22}O_2NClS$: C, 63.91; H, 5.90; N, 3.73. Found: C, 64.18; H, 5.90; N, 3.72.

Step B. — 2-chloro-10-[3-(4-morpholinyl)-propyl]-10-hydroxythiaxanthene, 10.99 g. (0.0292 mole) was reduced following the procedure of Example 8, step B, and employing 30 ml. of hydriodic acid, 30 ml. of glacial acetic acid and 3.62 g. of phosphorus. The 2-chloro-[3-(4-morpholinyl)-propyl]-thiaxanthene base was obtained in a yield of 10.33 g. (98.5%). The hydrochloride was prepared by dissolving the base in absolute ether and saturating the solution with dry hydrogen chloride. It melted at 209.5–211° C. (sintered at 208.5° C.) after recrystallizatiaon from a mixture of absolute alcohol and absolute ether.

*Analysis.*—Calculated for $C_{20}H_{22}ONClS \cdot HCl$: C, 60.60; H, 5.85; N, 3.53. Found: C, 60.78; H, 5.85; N, 3.50.

*Example 10. — 2-fluoro-10-(3-diethylaminopropyl-thiaxanthene hydrochloride*

Step A.—By replacing the 3-dimethylaminopropyl chloride and the 2-chlorothiaxanthone used in Example 7, step A, by an equimolecular quantity of 3-diethylaminopropyl chloride and 2-fluorothiaxanthone respectively, and following substantially the same procedures described in Example 7, step A, there was obtained 2-fluoro-10 - (3 - diethylaminopropyl) - 10 - hydroxythiaxanthene, M.P. 109.5–111° C.

*Analysis.*—Calculated for $C_{20}H_{24}ONSF$: C, 69.53; H, 7.00; N, 4.06. Found: C, 69.55; H, 6.83; N, 4.04.

Step B. — 2-fluoro-10-(3-diethylaminopropyl)-10-hydroxythiaxanthene, 5.00 g. (0.0145 mole) was reduced employing 14.5 ml. of hydriodic acid, 14.5 ml. of glacial acetic acid and 1.80 g. (0.058 gram atom) of phosphorus and following the procedure of Example 7 except that the reaction mixture was refluxed for 4 hours. The 2-fluoro-10-(3-diethylaminopropyl)-thiaxanthene was obtained in yield of 3.94 g. (82.8%). The base was dissolved in absolute ether and the solution treated with a solution of hydrogen chloride in absolute alcohol. The white crystalline hydrochloride that was formed was collected and recrystallized from a mixture of absolute alcohol and absolute ether. The hydrochloride melted at 169.7–170.7° C.

*Analysis.*—Calculated for $C_{20}H_{24}NFS \cdot HCl$: C, 65.64; H, 6.89; N, 3.83. Found: C, 65.68; H, 6.81; N, 3.81.

*Example 11.—2-bromo-10-(3-dimethylaminopropyl)-thiaxanthene hydrobromide*

By replacing the 2-chlorothiaxanthone employed in Example 7, step A, by an equimolar quantity of 2-bromothiaxanthene and following substantially the same procedures described in Example 7, steps A and B, there was obtained 2-bromo-10-(3-dimethylaminopropyl)-thiaxanthene hydrobromide.

*Example 12. — 2-chloro-10-[3-(1-piperidyl)-propyl]-thiaxanthene hydrobromide*

By replacing the 3-dimethylaminopropyl chloride employed in Example 7, step A, by 3-(1-piperidyl)-propyl chloride and following substantially the same procedure described in Example 7, steps A and B, there was obtained 2-chloro-10-[3-(1-piperidyl)-propyl]-thiaxanthene hydrobromide.

*Example 13.—2-chloro-10-(3-dimethylaminopropyl)-thiaxanthene hydrobromide*

Step A. — 2-chloro-10-(3-dimethylaminopropyl)-10-hydroxythiaxanthene, 3.34 g. (0.01 mole) obtained as described in Example 7, step A, was dissolved in 15 ml. of dry, alcohol-free chloroform. Acetyl chloride, 2.36 g. (0.03 mole) was added and the clear yellow solution was refluxed for one hour in a system protected by a drying tube. The solvent then was evaporated on the steam-bath under reduced pressure and the residue dissolved in absolute alcohol. The hydrochloride of 2-chloro-10-(3-dimethylaminopropylidene)-thiaxanthene was precipitated by the cautious addition of absolute ether. After drying at 70° C. the yield of white crystalline 2-chloro-10-(3-dimethylaminopropylidene) - thiaxanthene hydrochloride, M.P. 189–190° C. (to a cloudy melt), was 3.20 g. (90%). This material is a mixture of geometric isomers.

*Analysis.*—Calculated for $C_{18}H_{18}NClS \cdot HCl$: C, 61.36; H, 5.43; N, 3.97. Found: C, 61.51; H, 5.58; N, 3.89.

Step B. — 2-chloro-10-(3-dimethylaminopropylidene)-thiaxanthene hydrochloride, 17.62 g. (0.05 mole), hydriodic acid, 48% (stabilized with hypophosphorous acid) 50 ml. and phosphorus (red), 6.20 g. (0.2 gram atom) were placed in a 300 ml. 3-necked flask provided with a nitrogen inlet reaching almost to the bottom of the flask, a reflux condenser and a dropping funnel. The mixture, containing a dark red-brown mass was heated on the steam-bath and acetic anhydride, 50 ml. (0.54 mole) was added dropwise over a 20 minute period. The semisolid mass became dispersed and more fluid. The mixture was heated to refluxing with the nitrogen stream passing continually for 2 hours. The product then was isolated as described in Example 7, step B. The yield of 2-chloro-10-(3-dimethylaminopropyl)-thiaxanthene base was 15.33 g. (96.4%).

The base was converted to the hydrobromide that was obtained in a yield of 17.88 g. (89.4%), M.P. 194–195° C.

*Analysis.*—Calculated for $C_{18}H_{20}NClS \cdot HBr$: C, 54.21; H, 5.31; N, 3.51. Found: C, 54.46; H, 5.46; N, 3.50.

*Example 14.—Dextro 2-chloro-10-(3-dimethylaminopropyl)-thiaxanthene hydrogen dextro tartrate*

2-chloro-10-(3-dimethylaminopropyl)-thiaxanthene, obtained as in Example 13, 18.10 g. (0.0569 mole) and dextro tartaric acid, 8.55 g. (0.0569 mole) were dissolved in 57 ml. of absolute methanol. The solution was seeded and crystallization allowed to continue for 3 days at room temperature. The white crystalline dextro tartrate was obtained in a yield of 7.53 g., M.P. 161.5–164.5° C. (sintering at 159.5° C.). Repeated recrystallization from mixtures of absolute methanol and absolute ethanol gave the dextro 2-chloro-10-(3-dimethylaminopropyl)-thiaxanthene hydrogen dextro tartrate with a constant melting point of 168.5–169.5° C. The rotation of the salt was $[\alpha]_D^{26}$, +16.02, at a concentration of 5.0 g. per 100 ml. of solution in water.

*Analysis.*—Calculated for $C_{18}H_{20}NClS \cdot C_4H_6O_6$: C, 56.46; H, 5.60; N, 2.99. Found: C, 56.75; H, 5.66; N, 2.99.

*Example 15.—Levo 2-chloro-10-(3-dimethylaminopropyl)-thiaxanthene hydrogen levo tartrate*

The mother liquors from which the dextro isomer dextro tartrate was obtained in Example 14, above, were evaporated and the base liberated by treating the residue with sodium hydroxide, extracting the base into benzene and evaporating the benzene. The base so obtained, 10.67 g. (0.0336 mole) and levo tartaric acid, 5.04 g. (0.0336 mole) were dissolved in alcohol (3A anhydrous) and the solution concentrated to a volume of approximately 35 ml. After crystallization had been induced by scratching, the flask was allowed to stand for 3 hours at room temperature. The yield of crude levo 2-chloro-10-(3-dimethylaminopropyl)-thiaxanthene hydrogen levo tartrate, M.P. 163–164.5° C., was 11.71 g. This material was recrystallized from a mixture of absolute methanol and absolute ethanol till a constant M.P.; 168.5–169.5° C. and a constant rotation; $[\alpha]_D^{26}$, −16.0°, at a concentration of 5.0 g. per 100 ml. of solution in water, were attained.

Analysis.—Calculated for $C_{18}H_{20}NClS \cdot C_4H_6O_6$: C, 56.46; H, 5.60; N, 2.99. Found: C, 56.77; H, 5.83; N, 2.98.

*Example 16.—2-chloro-10-(3-dimethylaminopropyl)-thiaxanthene hydrobromide*

2 - chloro-10-(3-dimethylaminopropylidene)-thiaxanthene hydrochloride, 1.76 g. (0.005 mole), obtained as described in Example 13, step A, hydriodic acid 55%, 5 ml., and glacial acetic acid, 5 ml., were mixed and heated to refluxing with a nitrogen stream passing through continuously for two hours. The hot solution was diluted with 100 ml. of water and after destroying the iodine with a few drops of hypophosphorous acid, made strongly basic with 50 ml. of 10 N sodium hydroxide. The mixture was extracted with two 100 ml. portions of benzene and the benzene extract washed with water and extracted with two 30 ml. portions of 1 N hydrochloric acid. The acid solution was made basic with 10 N sodium hydroxide and extracted with benzene. Distillation of the benzene at reduced pressure on the steam-bath gave 1.3 g. of oily base from which 2-chloro-10-(3-dimethylaminopropyl)-thiaxanthene hydrobromide was obtained (by substantially the same procedure described in Example 7) in 57% yield (1.1 g.), M.P. 192.5–194° C. Crystallization from absolute ethanol-ether raised the M.P. to 194–195° C. with no depression on admixture with an authentic sample.

*Example 17.—2-chloro-10-(3-diethylaminopropyl)-thiaxanthene hydrobromide*

Step A.—By replacing the 3-dimethylaminopropyl chloride employed in Example 7, step A, by 3-diethylaminopropyl chloride and following substantially the same procedure described in Example 7, step A, there was obtained 2-chloro-10-(3-diethylaminopropyl)-10-hydroxythiaxanthene, M.P. 116.2–118.2° C. The thus obtained alcohol was dehydrated by the process described in Example 13, step A, to 2-chloro-10-(3-diethylaminopropylidene)-thiaxanthene hydrochloride.

Step B.—2-chloro-10-(3-diethylaminopropylidene)-thiaxanthene hydrochloride, 19.02 g. (0.05 mole) was substituted for the 2-chloro-10-(3-dimethylaminopropylidene)-thiaxanthene hydrochloride of Example 7, step B, and the procedure of Example 7, step B, followed except that refluxing was continued for 6 hours. The 2-chloro-10-(3-diethylaminopropyl)-thiaxanthene was obtained as a clear deep yellow oil in a yield of 16.61 g. The base was converted to the hydrobromide following the method of Example 7. The white crystalline hydrobromide melted at 161.5–162.5° C. after recrystallization from a mixture of absolute alcohol and absolute ether.

*Example 18.—2-methyl-10-(3-dimethylaminopropyl)-thiaxanthene hydrogen oxalate*

Step A.—By replacing the 2-chlorothiaxanthone employed in Example 7, step A, by 2-methylthiaxanthone and following substantially the same procedure described in Example 7, step A, there was obtained 2-methyl-10-(3 - dimethylaminopropyl)-10-hydroxythiaxanthene, M.P. 125–126° C. The thus obtained alcohol was dehydrated by the process described in Example 13, step A, to 2-methyl - 10 - (3-dimethylaminopropylidene)-thiaxanthene hydrochloride, M.P. 196.5–198.5° C.

Step B. — 2-methyl-10-(3-dimethylaminopropylidene)-thiaxanthene hydrochloride, 8.3 g. (0.025 mole) was reduced, employing 25 ml. of hydriodic acid, 25 ml. of glacial acetic acid and 3.1 g. (0.1 gram atom) of phosphorus and following the procedure of Example 7 except that refluxing was interrupted and the product isolated after 90 minutes. The 2-methyl-10-(3-dimethylaminopropyl)-thiaxanthene was obtained as a pale yellow oil, weighing 6.7 g. (90%). The hydrogen oxalate salt melted at 155–160° C. after recrystallization from absolute alcohol.

Analysis.—Calculated for $C_{19}H_{23}NS \cdot C_2H_2O_4$: C, 65.09; H, 6.50; N, 3.62. Found: C, 65.30; H, 6.70; N, 3.61.

*Example 19.—2-chloro-10-(3-dimethylaminobutyl)-thiaxanthene*

By replacing the 3-dimethylaminopropyl chloride employed in Example 1, step E, by an equimolecular quantity of 3-dimethylaminobutyl chloride and following substantially the same procedures described in Example 1, step E, there was obtained 2-chloro-10-(3-dimethylaminobutyl)-thiaxanthene.

*Example 20.—4-chloro-10-(3-dimethylaminopropyl)-thiaxanthene*

Step A.—By substituting 3-diethylaminopropyl chloride and 4-chlorothiaxanthone respectively for the 3-dimethylaminopropyl chloride and the 2-chlorothiaxanthone employed in Example 7, step A, and following substantially the procedure of Example 7, step A, 4-chloro-10-hydroxy-10-(3-diethylaminopropyl)-thiaxanthene is obtained as a white crystalline solid, M.P. 139–140° C.

Step B.—Dehydration of the 4-chloro-10-hydroxy-10-(3-diethylaminopropyl)-thiaxanthene thus obtained by means of acetyl chloride following the procedure of Example 13, step A, gave 4-chloro-10-(3-dimethylaminopropylidene)-thiaxanthene hydrochloride. The white crystalline product was obtained as a mixture of geometric isomers, M.P. 208–209° C.

Analysis.—Calculated for $C_{20}H_{22}NClS \cdot HCl$: C, 63.15; H, 6.09; N, 3.68. Found: C, 63.31; H, 6.15; N, 3.66.

Step C.—The 4-chloro-10-(3-diethylaminopropylidene)-thiaxanthene hydrochloride thus obtained was reduced with hydrogen iodide by substantially the same procedure as described in Example 13, step B, yielding 4-chloro-10-(3-diethylaminopropyl)-thiaxanthene.

*Example 21.—2 - iodo - 10 - (3 - dimethylaminopropyl) - thiaxanthene*

By replacing the 2-chlorothiaxanthone employed in Example 7, step A, by an equimolecular quantity of 2-iodothiaxanthone and following substantially the same procedures described in Example 7, steps A and B, omitting the salt forming procedure, there was obtained 2-iodo-10-(3-dimethylaminopropyl)-thiaxanthene.

*Example 22.—2 - chloro - 10 - (1 - methyl - 3 - piperidylmethyl)-thiaxanthene*

Step A.—The Grignard reagent was prepared from 27 g. (0.183 mole) of 1-methyl-3-piperidylmethyl chloride and 4.45 g. (0.183 gram atom) of magnesium in 90 ml. of tetrahydrofuran following the procedure of Example 7, step A, and employing 2.0 g. of ethyl bromide to initiate the reaction. 2-chlorothiaxanthone, 22.6 g. (0.0915 mole), prepared as described in Example 1, steps A–D, was added and the product, 2-chloro-10-hydroxy-10-(1-methyl-3-piperidylmethyl)-thiaxanthene isolated following the method of Example 7, step A. The product was separated into two diasterioisomers.

The form designated α (i.e., the first isomer isolated) melted at 182–183.5° C. after recrystallization from a mixture of alcohol and water.

The form designated β (i.e., the second isomer isolated) melted at 130–135° C. after recrystallization from hexane.

*Step B.*—Each of the diasterioisomers thus obtained was separately reduced by hydrogen iodide to 2-chloro-10-(1-methyl-3-piperidylmethyl)-thiaxanthene by substantially the same procedure described in Example 7, step B, omitting the salt forming step.

The following example will illustrate a suitable dosage form for administering the thiaxanthene compounds of this invention. As the preparation of dosage forms of these active ingredients does not present any problem, other conventional dosage forms can be substituted for that specifically described below. Similarly, as any of the thiaxanthene compounds identified above can be incorporated in any conventional dosage form, the dosage of only one compound is described below with the understanding that any of the other thiaxanthenes could be substituted for it.

*Example 23.*—Compressed tablet containing 0.5 gm. active ingredient per tablet

|  | Grams |
|---|---|
| 2 - chloro - 10 - (3 - dimethylaminopropyl)-thiaxanthene hydrobromide | 50.00 |
| Acacia | 1.50 |
| Starch paste 1½% } equal parts<br>Gelatin solution 20% }<br>  Use 12 gms.—allow | 2.00 |
| Distilled water, q.s. |  |
|  | 53.50 |
| Add: |  |
| Starch, dried | 5.43 |
| Magnesium stearate | 0.27 |
| Total weight mixed granulation | 59.20 |

The thiaxanthene, acacia, starch, gelatin and water are mixed thoroughly and passed through a No. 100 screen three times. The starch and magnesium stearate then are mixed thoroughly and passed through a No. 100 screen three times after which this mixture is added to the other ingredients, mixed thoroughly and passed through a No. 8 screen three times. The entire mixture then is dried at 110–120° F. for 18–20 hours and passed through a No. 20 screen. The granulation is compressed into tablets using a ½" standard curvature scored die having a thickness of 0.230±0.005", yielding 100 tablets each weighing 592 mgs. and having a hardness of 5 to 6 kg. measured by the Monsanto Chemical Company Tablet Hardness Tester Apparatus and a distintegration time of 3 minutes tested on the U.S.P. Tablet Disintegrating Apparatus (U.S. Pharmacopeia, 15th Edition, page 937).

While the invention has been illustrated by certain particular thiaxanthene derivatives and certain specific methods for preparing these compounds as well as a particular dosage form suitable for administering the compounds, it is to be understood the invention contemplates their equivalents and is limited solely by the scope of the appended claims.

This application is a continuation-in-part of our co-pending U.S. patent application Ser. No. 508,772, filed May 16, 1955, now abandoned.

What is claimed is:

1. Thiaxanthene compounds selected from the class consisting of compounds having the general structural formula

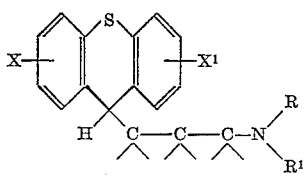

and non-toxic acid addition salts thereof, wherein X is selected from the group consisting of hydrogen, halogen, lower alkyl and lower alkoxy radicals; X¹ is selected from the group consisting of halogen, lower alkyl and lower alkoxy radicals;

is selected from the group consisting of di-lower-alkyl-amino, 1-piperidyl, 1-pyrrolidyl and 4-morpholinyl groups; and the valences attached to the trimethylene chain are attached to hydrogen atoms.

2. A thiaxanthene compound having the general structural formula

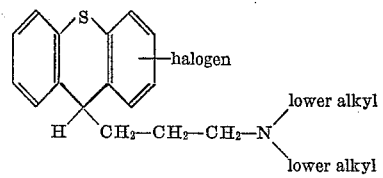

3. 2 - chloro - 10 - (3 - dimethylaminopropyl) - thiaxanthene.

4. 2 - chloro - 10 - (3 -diethylaminopropyl) - thiaxanthene.

5. In a process for preparing thiaxanthene compounds the steps comprising reducing a compound selected from the group consisting of an alcohol and an olefin having, respectively, the general structural formula

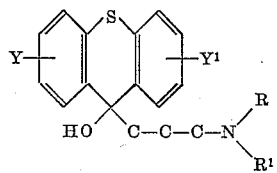

and

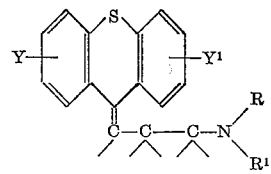

with hydrogen iodide wherein, in each of the formulas, Y is selected from the group consisting of hydrogen, halogen and a lower alkyl radical; Y¹ is selected from the group consisting of halogen and lower alkyl;

is selected from the group consisting of di-lower-alkyl-amino, 1-piperidyl, 1-pyrrolidyl and 4-morpholinyl groups; and the valences attached to the trimethylene chain are attached to hydrogen atoms.

6. A process as claimed in claim 5, wherein the reduction is carried out with hydrogen iodide in the presence of phosphorus.

7. In a process for preparing thiaxanthene compounds the step comprising reducing an alcohol having the general structural formula

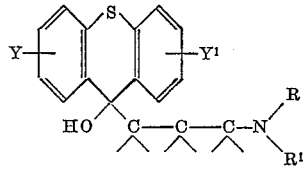

with hydrogen iodide to a compound having the general structural formula

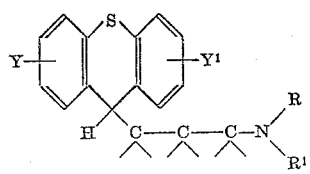

wherein, in each of the formulas, Y is selected from the group consisting of hydrogen, halogen and a lower alkyl radical; $Y^1$ is selected from the group consisting of halogen and lower alkyl;

is selected from the group consisting of di-lower-alkylamino, 1-piperidyl, 1-pyrrolidyl and 4-morphilinyl groups; and the valences attached to the trimethylene chain are attached to hydrogen atoms.

8. In a process for preparing thiaxanthene compounds the steps comprising reducing an olefin having the general structural formula

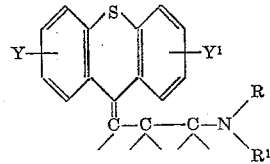

with hydrogen iodide wherein Y is selected from the group consisting of hydrogen, halogen and a lower alkyl radical; $Y^1$ is selected from the group consisting of halogen and lower alkyl;

is selected from the group consisting of di-lower-alkylamino, 1-piperidyl, 1-pyrrolidyl and 4-morpholinyl groups; and the valences attached to the trimethylene chain are attached to hydrogen atoms.

References Cited in the file of this patent

UNITED STATES PATENTS

| | | |
|---|---|---|
| 2,368,006 | Cusic | Jan. 23, 1945 |
| 2,676,971 | Cusic | Apr. 27, 1954 |